United States Patent [19]
Tomisawa

[11] Patent Number: 5,584,276
[45] Date of Patent: Dec. 17, 1996

[54] IGNITION TIMING CONTROLLING APPARATUS AND METHOD FOR INTERNAL COMBUSTION ENGINE WITH EXHAUST GAS PURIFICATION CATALYTIC CONVERTER

[75] Inventor: Naoki Tomisawa, Atsugi, Japan

[73] Assignee: Unisia Jecs Corporation, Atsugi, Japan

[21] Appl. No.: 529,210

[22] Filed: Sep. 15, 1995

[30] Foreign Application Priority Data

Sep. 19, 1994 [JP] Japan .................... 6-223737

[51] Int. Cl.$^6$ .................... F02P 5/15; F02P 5/153
[52] U.S. Cl. .................... 123/419; 123/424
[58] Field of Search .................... 123/419, 424, 123/425; 60/284

[56] References Cited

U.S. PATENT DOCUMENTS 4,271,798  6/1981  Seitz et al. .................... 123/419
4,699,105  10/1987  Jensen .................... 123/425

FOREIGN PATENT DOCUMENTS 61-66865  4/1986  Japan .................... 123/419
5-272396  10/1993  Japan .

*Primary Examiner*—Andrew M. Dolinar
*Attorney, Agent, or Firm*—Foley & Lardner

[57] ABSTRACT

During a predetermined period of time T upon a start of the engine, when low frequency components of a variation in either of an engine revolution speed or combustion pressure are extracted and the extracted low frequency component level is below a predetermined value ($\Delta Nref$ or $\Delta Peref$), an ignition timing is retarded up to a limit such that a variation state of either of the engine revolution speed or the combustion pressure is kept at a value below the predetermined value.

9 Claims, 3 Drawing Sheets

IGNITION TIMING CONTROLLING APPARATUS AND METHOD FOR INTERNAL COMBUSTION ENGINE WITH EXHAUST GAS PURIFICATION CATALYTIC CONVERTER

BACKGROUND OF THE INVENTION

1. Field of the Invention

The present invention relates to an ignition timing controlling apparatus and method for an internal combustion engine having an exhaust gas purification catalytic converter which achieve a promotion of activation of the exhaust gas purification catalytic converter maintaining a stability of engine driving.

It is necessary to activate an exhaust gas purification catalytic converter as early as possible after an engine has started, in order to improve an exhaust gas purification performance.

A Japanese Patent Application First Publication No. Heisei 5-272396 published on Oct. 19, 1993 exemplified a previously proposed engine control system in which an ignition timing is retarded after tile engine has started so that a gas component not combusted in the engine is exhausted to generate a recombustion heat within an exhaust passage, its reaction heat causing the exhaust gas purification catalytic converter to be activated as early as possible.

It is, however, noted that too large a retardation angle of the ignition timing causes an imperfect combustion per se so that a surge and/or revolution speed variation is generated. This means a worsening in engine driveability. A limit is placed on the remarkable retardation of the ignition timing angle.

SUMMARY OF THE INVENTION

It is therefore a principal object of the present invention to provide ignition timing controlling apparatus and method for an internal combustion engine having an exhaust gas purification catalytic converter which can promote an activation of the catalytic converter as early as possible upon a start of the engine suppressing a surge and/or engine revolution speed variation.

The above-described object can be achieved by providing an ignition timing controlling apparatus for an internal combustion engine, the internal combustion engine having an exhaust gas purification catalytic converter, comprising: a) engine operating condition determining parameter determining means for determining a parameter determining an engine operating condition ; b) parameter variation determining means for determining a variation in the detected parameter; and c) ignition timing retardation angle controlling means for retarding the ignition timing up to a limit such that the variation in the determined parameter is kept at a value below a predetermined value during a predetermined period of time upon a start of the engine.

The above-described object can also be achieved by providing an ignition timing controlling apparatus for an internal combustion engine, the internal combustion engine having an exhaust gas purification catalytic converter, comprising: (a) a crank angle sensor which is so arranged and constructed as to detect an engine revolution speed and so as to output an engine revolution speed signal indicative of the engine revolution speed; (b) engine revolution speed variation detecting means for detecting a variation in time of the engine revolution speed signal from said crank angle sensor; and (c) ignition timing retardation angle controlling means for retarding an igniting timing up to a limit such that the variation in the engine revolution speed signal is kept at a value below a predetermined value during a predetermined period of time upon a start of the engine.

The above-described object can also be achieved by an ignition timing controlling apparatus for an internal combustion engine, the internal combustion engine having an exhaust gas purification catalytic converter, comprising: a) a combustion pressure responsive sensor which is so arranged and constructed as to detect a fuel combustion pressure state within at least one of engine cylinders and output a signal indicating the combustion pressure state; b) engine revolution speed variation detecting means for detecting a variation in time of the combustion pressure from the combustion pressure state indicative signal; and (c) ignition timing retardation angle controlling means for retarding an igniting timing up to a limit such that the variation in the engine revolution speed signal is kept at a value below a predetermined value during a predetermined period of time upon a start of the engine.

The above-described object can also be achieved by providing an ignition timing controlling method for an internal combustion engine, the internal combustion engine having an exhaust gas purification catalytic converter, comprising the steps of: (a) determining a parameter determining a parameter determining an engine operating condition ; (b) determining a variation in the detected parameter; and (c) retarding the ignition timing up to a limit such that the variation in the determined parameter is kept at a value below a predetermined value during a predetermined period of time upon a start of the engine.

DESCRIPTION OF THE PREFERRED EMBODIMENTS

Reference will hereinafter be made to the drawings in order to facilitate a better understanding of the present invention.

Figure 1A:
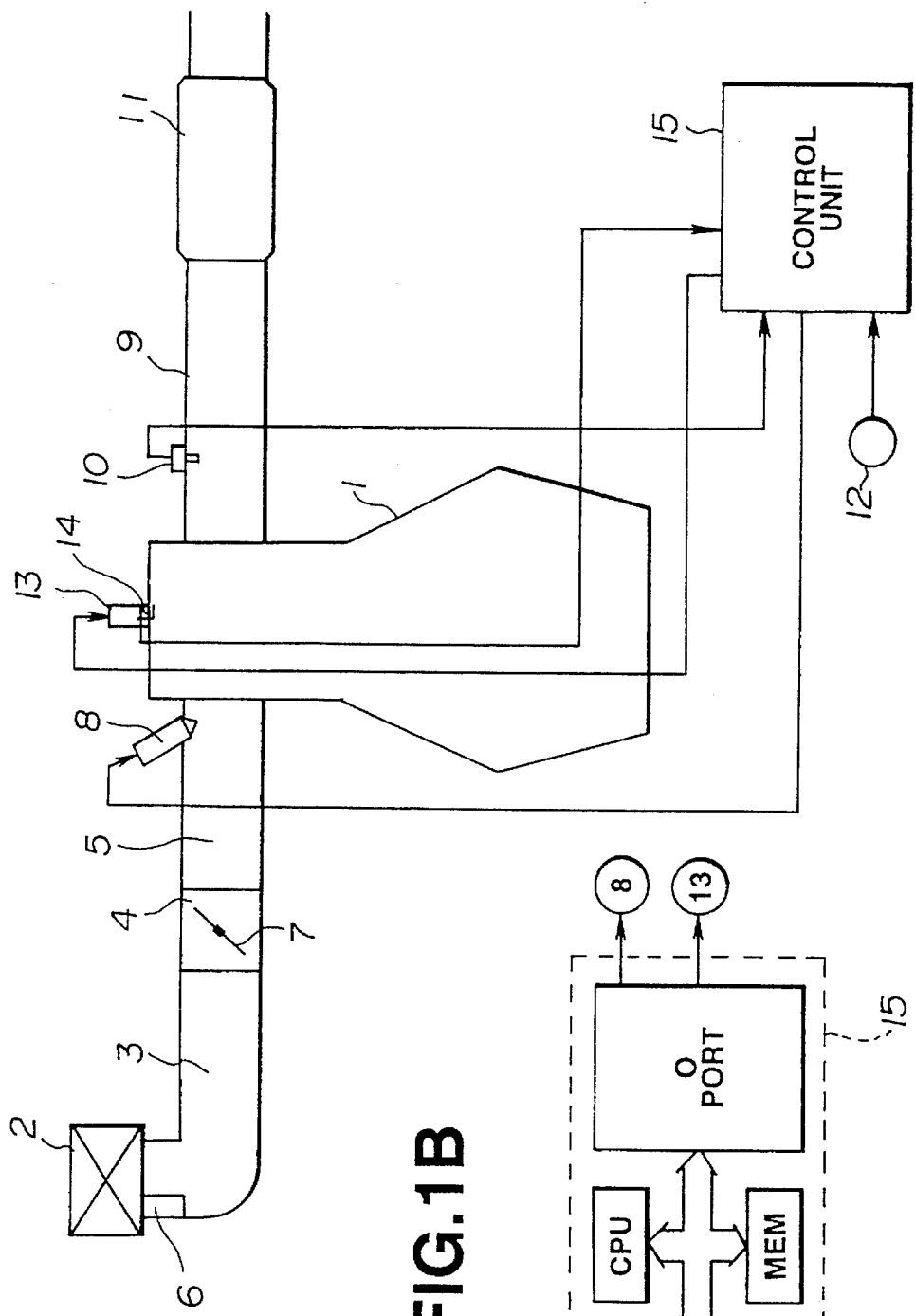
FIG. 1A is a circuit block diagram of an ignition timing controlling apparatus in first preferred and second preferred embodiments applicable to an internal combustion engine according to the present invention.

FIG. 1 shows a preferred embodiment of an ignition timing controlling apparatus according to the present invention which is applicable to an internal combustion engine.

An intake air of an internal combustion engine 1 is sucked via an air cleaner 2, intake air duct 3, a throttle chamber 4, and intake manifold 5.

The intake duct 3 is provided with an air flow meter 6 in order to detect an intake air quantity Q. A throttle valve 7 is disposed within the throttle chamber 4 which is interlocked with an accelerator pedal (not shown) so that an opening angle of the throttle valve 7 is adjusted to provide an adjusted air quantity to the engine 1. The intake manifold 5 is provided with electromagnetic type fuel injection valves 8 for respective engine cylinders. Each fuel injection valve 8 injects fuel whose quantity is controlled by a control unit 15, the injected fuel being pressurized under a predetermined pressure and being supplied from a fuel pump (not shown).

An exhaust passage 9 of the engine 1 is provided with an air-fuel mixture ratio sensor 10 (so-called, oxygen concentration sensor) which serves to detect an air/fuel mixture ratio on the basis of an oxygen concentration in the exhaust gas in order to perform an air/fuel mixture ratio control and is provided with an exhaust gas purification catalytic converter (three-way catalytic converter, TWC) 11.

A crank angle sensor 12 is provided in the engine 1 for producing a reference signal REF whenever the engine has revolved through a predetermined crank angle, i.e., for each crank angle phase difference of the corresponding one of the engine cylinders (for example, in a case of a four-cylinder engine, 180°) and for outputting a unit angle signal POS whenever the crankshaft has revolved through a unit of angle (for example, 1°). In addition, a combustion pressure responsive sensor 14 is installed on an ignition plug 13 as a washer of the plug so as to detect an inner pressure of the respective engine cylinders. It is noted that the combustion pressure responsive sensors 14 are plural and disposed on the respective ignition plugs for the respective cylinders.

The detection signals from these sensors are supplied to the control unit 15.

The control unit 15 detects the variation state of either of the engine revolution speed or the combustion pressure and controls the ignition timing so as to retard the ignition timing up to a limit such that the variation in either of the engine revolution speed or combustion state is kept at a value below a predetermined value.

Figure 1B:
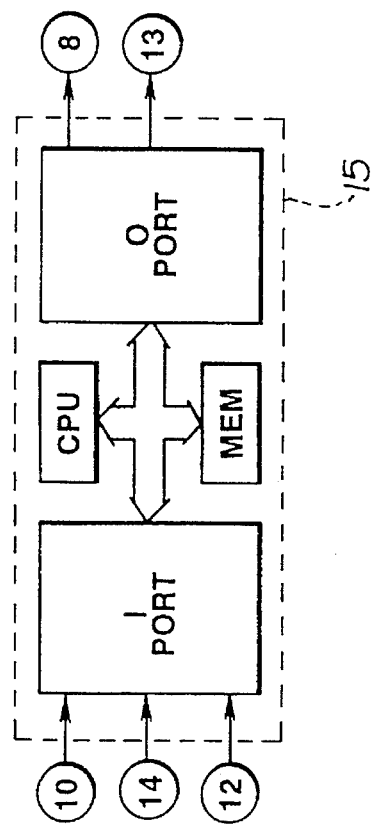
FIG. 1B is a system configuration in a control unit shown in FIG. 1A.

FIG. 1B shows a structure of the control unit.

The control unit 15 includes a microcomputer having a CPU (Central Processing Unit), MEM (Memory such as ROM and RAM), Input port, Output port, and a common bus.

Figure 2:
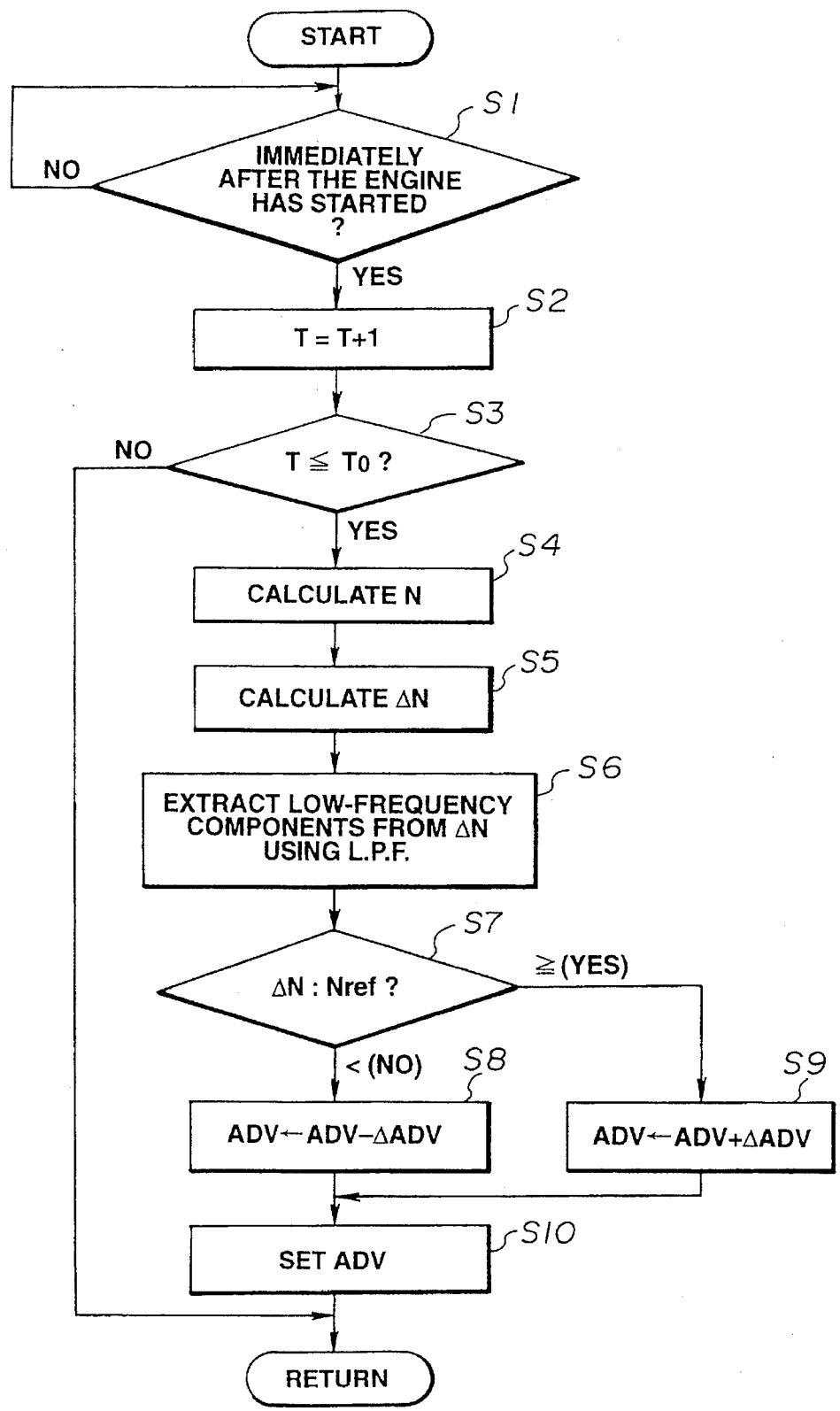
FIG. 2 is an operational flowchart of an ignition timing control routine upon a start of the engine shown in FIG. 1A as the first embodiment.

FIG. 2 shows an operational flowchart executed by the microcomputer of the control unit 15 for explaining an ignition timing retardation control, maintaining the variation in the engine revolution speed at the value below the predetermined value.

At a step S1, the CPU determines whether the present time is a time immediately after the engine has started. At this time, the CPU may refer to an ignition key position of the engine (the CPU may determine whether the ignition switch is turned from OFF state to ON state or the CPU may determine that the output signal is generated from the crank angle sensor 12).

If the CPU determines that the present time is the time immediately after the engine has started at the step S1, the routine goes to a step S2.

At the step S2, a timer T measuring a passed time from a time at which the CPU has determined that it is the time immediately after the engine has started is incremented by one (T=T+1).

At the next step S3, the CPU determines whether the passed time after the engine has started is within a predetermined period of time $T_0$.

If the value of the timer T is within the predetermined period of time $T_O$ at the step S3, the routine goes to a step S4.

At the step S4, the CPU calculates the engine revolution speed N as a value inversely proportional to the period of the reference signal REF or a value proportional to the number of times the unit angle POS is received within a predetermined time.

At the step S5, the CPU calculates the variation ΔN of the calculated engine revolution speed N from a difference in the engine revolution speed N for each predetermined period of time.

At the next step S6, the CPU extracts low frequency components (for example, 2 Hz to 10 Hz) which would give an influence on an engine driveability (give an unpleasant feeling to a vehicular occupant of a vehicle in which the engine shown in FIG. 1 is mounted) from the signal indicating the variation ΔN in the engine revolution speed using a low pass filter calculation.

At the next step S7, the CPU compares the extracted revolution speed variation ΔN from the step S6 with a predetermined value Nref.

If the extracted revolution speed variation ΔN is compared with the predetermined value Nref at the step S7 and the extracted engine revolution speed variation ΔN is below the predetermined value Nref (NO), the routine goes to a step S8. On the other hand, if the extracted engine revolution speed variation ΔN is equal to or above the predetermined value Nref, the routine goes to a step S9.

At the step S8, the CPU retards the present ignition timing ADV by a predetermined retardation angle ΔADV. At the step S9, the CPU advances the present ignition timing ΔADV by the predetermined advance angle ADV.

At a step S10, the CPU sets the ignition timing ADV thus corrected at either of the step S8 or step S9.

Thus, the control unit 15 outputs the ignition signal to the corresponding one of the ignition plugs at the thus determined ignition timing ADV.

On the other hand, if the CPU determines that the predetermined period of time To has passed after the engine start at the step S3, the routine is ended without correction of the ignition timing.

As described above with reference to FIG. 2, the ignition timing is retarded up to the limit such that the variation in the engine revolution speed is kept at the value below the predetermined value Nref during the predetermined period of time T upon the start of the engine. Hence, the ignition timing is retarded quickly maintaining the stable driving state so that the exhaust gas component (HC) not combusted in the engine is increased to be in a recombustion state in the exhaust gas passage 9. Its reaction heat can promote the activation of the exhaust gas purification catalytic converter 10 as early as possible. Consequently, the exhaust gas purification performance can be remarkably enhanced by means of the exhaust gas purification catalytic converter in a short time upon the engine start.

Figure 3:
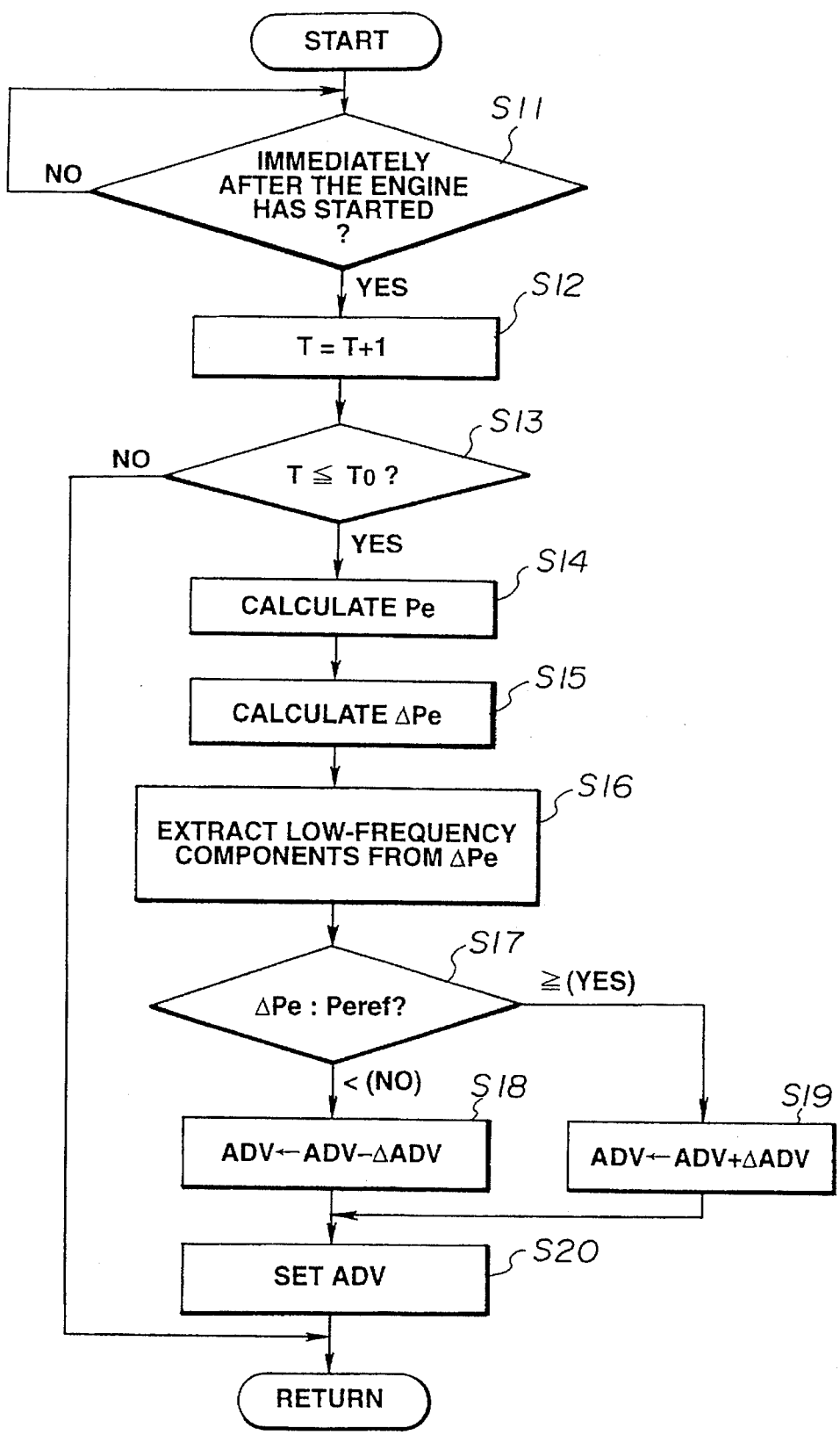
FIG. 3 is another operational flowchart of an ignition timing control routine upon a start of the engine shown in FIG. 1B as the second embodiment.

FIG. 3 shows an operational flowchart for the ignition timing retardation control routine, maintaining the combustion pressure variation below the predetermined value (Peref).

At a step S11, the CPU determines whether the present time is immediately after the engine start.

If the CPU determines that the engine has just started, namely, it is the time immediately after the engine has started (YES) at the step S11, the routine goes to a step S12.

At the step S12, the timer T is incremented by one (T=T+1).

At a step S13, the CPU determines whether the passed time from the time at which the engine has started is within the predetermined time To.

If the CPU determines that the passed time from the time at which the engine has started is within the predetermined time To (YES) at the step S13, the routine goes to a step S14.

At the step S14, the CPU reads the combustion is pressure Pe from the signal derived from the combustion pressure responsive sensor 12.

At a step S15, the CPU calculates the variation ΔPe of the combustion chamber pressure Pe.

At a step S16, the CPU extracts the low frequency components (for example, 2 Hz to 10 Hz) from the signal indicating the variation ΔPe in the combustion pressure using the low-pass filter calculation as in the same manner as the step S6 shown in FIG. 2.

At a step S17, the extracted low frequency components of the variation ΔPe is compared with the predetermined value Peref. If 66 pe <Peref (NO) at the step S17, the present ignition timing ADV is retarded by the predetermined retardation angle (ADV=ADV−ΔADV).

If ΔPe≧ Peref at the step S18 (YES) at the step S17, the routine goes to a step S19 in which ADV is advanced by ΔADV.

At the next step S20, the value of ADV thus corrected at either the step S18 or step S19. Consequently, the ignition is carried out at the timing of ADV.

In addition, when the CPU determines that the predetermined time To is passed upon the engine start at the step S11, the routine is ended without correction of the ignition timing.

In this way, in the same as the first embodiment, the ignition timing is retarded up to a limit at which the variation in combustion pressure is kept at a value below the predetermined value during the predetermined period of time T after the engine has started. Therefore, since the ignition timing is retarded as early as possible maintaining the stable engine operating condition, the noncombustible component (HC) in the exhaust gas is increased and the noncombustible component is in recombustion and its reaction heat can promote the activation of the exhaust gas purification catalytic converter 10. Consequently, the exhaust gas purification performance by means of the catalytic converter can sufficiently be enhanced in the short period of time upon the start of the engine.

It is finally noted that the predetermined period of time To at the step S3 or step S13 is, for example, 20 seconds.

What is claimed is:

1. An ignition timing controlling apparatus for an internal combustion engine, said internal combustion engine having an exhaust gas purification catalytic converter in an exhaust gas passage, comprising:

a) a sensor for detecting an engine roughness and for outputting a signal indicative of the engine roughness; and b) a control unit having a microcomputer for determining a variation in the engine roughness output signal from the sensor and for retarding an ignition timing up to a limit such that a variation in the determined variation is kept at a value below a predetermined value during a predetermined period of time after a start of the engine, said microcomputer further including a low pass filter which is constructed and arranged so as to extract low frequency components of a signal indicating the variation in a predetermined low frequency band and a comparator for comparing the low frequency components of the variation with the predetermined value, wherein said microcomputer controls the ignition timing so as to retard the instantaneous ignition timing when said comparator determines that the variation passed through the low pass filter is below the predetermined value.

2. An ignition timing controlling apparatus as claimed in claim 1, wherein the control unit further includes determining means for determining whether a present time is a time immediately after the engine has started and wherein said microcomputer controls the ignition timing when said determining means determines that the present time is a time immediately after the engine has started.

3. An ignition controlling apparatus as claimed in claim 2, further comprising a timer which is arranged and constructed so as to determine whether the present time has passed by the predetermined period of time, said timer being reset when the predetermined period of time has passed so that said microcomputer no longer controls the ignition timing.

4. An ignition timing controlling apparatus as claimed in claim 3, wherein the predetermined low frequency band of said low pass filter ranges from 2 Hz to 10 Hz.

5. An ignition timing controlling apparatus as claimed in claim 1, wherein the sensor comprises an engine revolution speed sensor.

6. An ignition timing controlling apparatus as claimed in claim 1, wherein the sensor comprises a combustion pressure sensor.

7. An ignition timing controlling method for an internal combustion engine, said internal combustion engine having an exhaust gas purification catalytic converter in an exhaust gas passage, said method comprising the steps of:

(a) detecting an engine roughness and outputting a signal indicative of the engine roughness; and (b) determining a variation in said engine roughness output signal and retarding an ignition timing up to a limit such that a variation in the determined variation is kept at a value below a predetermined value during a predetermined period of time after a start of the engine, wherein said step (b) includes a step (b1) of extracting low frequency components of a signal indicating a variation in a predetermined low frequency band and a step (b2) of comparing the low frequency components of the variation with the predetermined value, and wherein, at said step (b), the ignition timing is controlled so as to retard the instantaneous ignition timing when the variation passed through the low pass filter is below the predetermined value.

8. An ignition timing controlling method as claimed in claim 7, wherein an engine revolution speed is detected.

9. An ignition timing controlling method as claimed in claim 7, wherein a combustion pressure is detected.

\* \* \* \* \*